United States Patent
Almalfouh et al.

(10) Patent No.: US 10,200,897 B2
(45) Date of Patent: Feb. 5, 2019

(54) RADIO LINK MONITORING USING DOWNLINK CONTROL AND DATA DECODING PERFORMANCE CHARACTERISTICS

(71) Applicant: Apple Inc., Cupertino, CA (US)

(72) Inventors: Sami M. Almalfouh, San Jose, CA (US); Li Su, San Jose, CA (US); Sai Sravan Bharadwaj Karri, Santa Clara, CA (US); Chiranjeevi M. Kosuri, Morgan Hill, CA (US); Karthik Chockalingam, Santa Clara, CA (US); Swaminathan Balakrishnan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/476,632

(22) Filed: Mar. 31, 2017

(65) Prior Publication Data

US 2017/0311189 A1    Oct. 26, 2017

Related U.S. Application Data

(60) Provisional application No. 62/332,764, filed on May 6, 2016, provisional application No. 62/327,858, filed on Apr. 26, 2016.

(51) Int. Cl.
*H04W 24/08* (2009.01)
*H04W 56/00* (2009.01)
(Continued)

(52) U.S. Cl.
CPC .......... *H04W 24/08* (2013.01); *H04B 17/336* (2015.01); *H04W 56/0035* (2013.01); *H04W 76/10* (2018.02)

(58) Field of Classification Search
CPC ...................................................... H04W 88/08
See application file for complete search history.

(56) References Cited

U.S. PATENT DOCUMENTS 8,712,401 B2   4/2014  Yoo et al.
8,934,365 B2   1/2015  Medles et al.
(Continued)

FOREIGN PATENT DOCUMENTS

WO   WO 2010/053793   5/2010
WO   WO 2016/140599   9/2016

OTHER PUBLICATIONS

Ericsson; "Analysis of 1 UE Rx on RLM Requirements"; 3GPP Draft; R4-141375 RLM for 1 RX, 3rd Generation Partnership Project (3GPP), Mobile Competence Centre, 658, Route Des Lucioles, F-86921 Sophia-Antipolis Cedex, France; vol. RAN WG4, no. San Jose Del Cabo, Mexico; 28148331-28148484, Mar. 31, 2014, XP858796523; six pages.
(Continued)

*Primary Examiner* — Chandrahas B Patel
(74) *Attorney, Agent, or Firm* — Meyertons Hood Kivlin Kowert & Goetzel, P.C.; Jeffrey C. Hood; Joel L. Stevens

(57) ABSTRACT

This disclosure relates to radio link monitoring techniques. According to some embodiments, a wireless device may establish a radio link with a cellular base station according to a radio access technology. The base station may provide reference signals, control signals, and data signals to the wireless device via the radio link. The wireless device may perform radio link monitoring of the radio link using characteristics of decoding performance for one or more of the control signals and the data signals. Performing radio link monitoring of the radio link may include determining whether the radio link is in-sync or out-of-sync and determining whether radio link failure has occurred.

20 Claims, 6 Drawing Sheets

(51) Int. Cl.
*H04W 76/10* (2018.01)
*H04B 17/336* (2015.01)

(56) References Cited

U.S. PATENT DOCUMENTS

| | | |
|---|---|---|
| 9,521,567 B2 | 12/2016 | Lee et al. |
| 9,763,283 B2 * | 9/2017 | Jung ..................... H04W 24/04 |
| 2012/0122440 A1 | 5/2012 | Krishnamurthy et al. |
| 2015/0126206 A1 | 5/2015 | Krishnamurthy et al. |

OTHER PUBLICATIONS

International Search Report and Written Opinion, Application No. PCT/US2017/027345, dated Jun. 12, 2017, 16 pages.

* cited by examiner

RADIO LINK MONITORING USING DOWNLINK CONTROL AND DATA DECODING PERFORMANCE CHARACTERISTICS

PRIORITY INFORMATION

This application claims priority to U.S. provisional patent application Ser. No. 62/327,858, entitled "Radio Link Monitoring (RLM) for NW-Assisted Coverage-Constrained UEs," filed Apr. 26, 2016, and to U.S. provisional patent application Ser. No. 62/332,764, entitled "Radio Link Monitoring Using Downlink Control and Data Decoding Performance Characteristics," filed May 6, 2016, which are both hereby incorporated by reference in their entirety as though fully and completely set forth herein.

TECHNICAL FIELD

The present application relates to wireless communication, including to techniques for performing radio link monitoring using downlink control and data decoding performance characteristics.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". Many such devices have relatively limited wireless communications capabilities and typically have smaller batteries than larger portable devices, such as smart phones and tablets. In general, it would be desirable to recognize and provide support for the relatively limited wireless communication capabilities of such devices. Therefore, improvements in the field are desired.

SUMMARY

Embodiments are presented herein of, inter alia, systems, apparatuses, and methods for a wireless device to perform radio link monitoring using downlink control and data decoding performance characteristics.

In many instances, a wireless device may be able to monitor and evaluate a radio link based effectively primarily or exclusively based on reference signals provided by its serving base station. However, there may be many instances in which such techniques may not provide the most accurate evaluation of the radio link. For instance, in some scenarios, a link-budget-limited wireless device may benefit from power boosting of control and/or data resource elements, while the reference signals may not be power boosted. This power boosting may enable the wireless device to successfully receive and decode control and/or data signals more effectively than might be indicated by evaluating the radio link based on (unboosted) reference signals.

Accordingly, techniques are described herein for supplementing radio link monitoring techniques with the use of characteristics of decoding performance for control and/or data signals, e.g., in addition to the use of reference signals. According to the techniques described herein, a wireless device may be able to modify its radio link monitoring criteria for when the wireless device is in-sync or out-of-sync based at least in part on the decoding performance for control and/or data signals, and/or may be able to reset or modify an out-of-sync counter, an out-of-sync timer, and/or an in-sync counter based on whether decoding performance for control and/or data signals is or is not satisfactory during each of one or more evaluation periods.

Such techniques may enable a wireless device to successfully communicate using a radio link that might otherwise be deemed unsustainable, e.g., if the wireless device is able to recognize the availability of and make use of network-assist features for coverage constrained wireless device, and/or in any of various other (e.g., coverage constrained or non-coverage constrained) possible scenarios.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
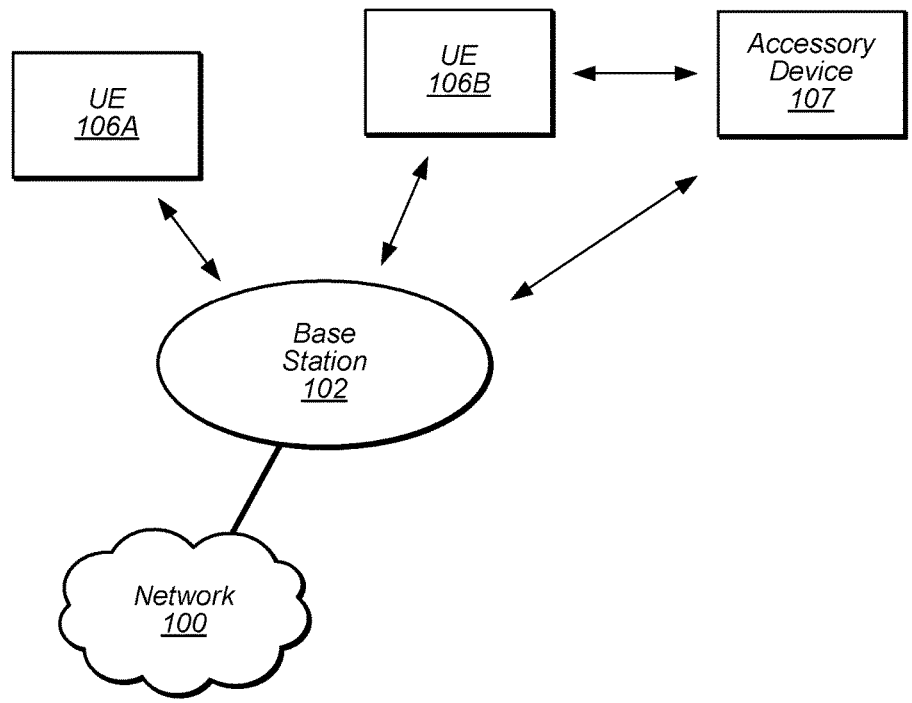
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

Figure 2:
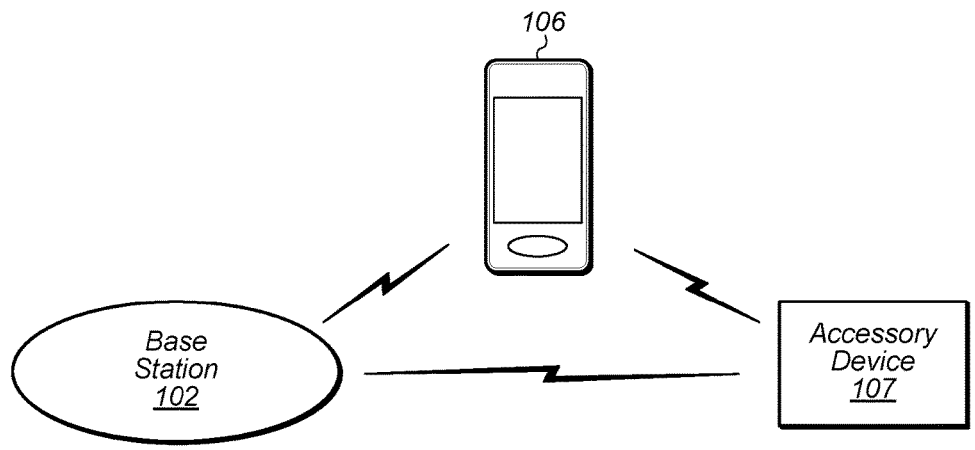
FIG. 2 illustrates an example system where an accessory device can selectively either directly communicate with a cellular base station or utilize the cellular capabilities of an intermediate or proxy device such as a smart phone, according to some embodiments.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processor elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
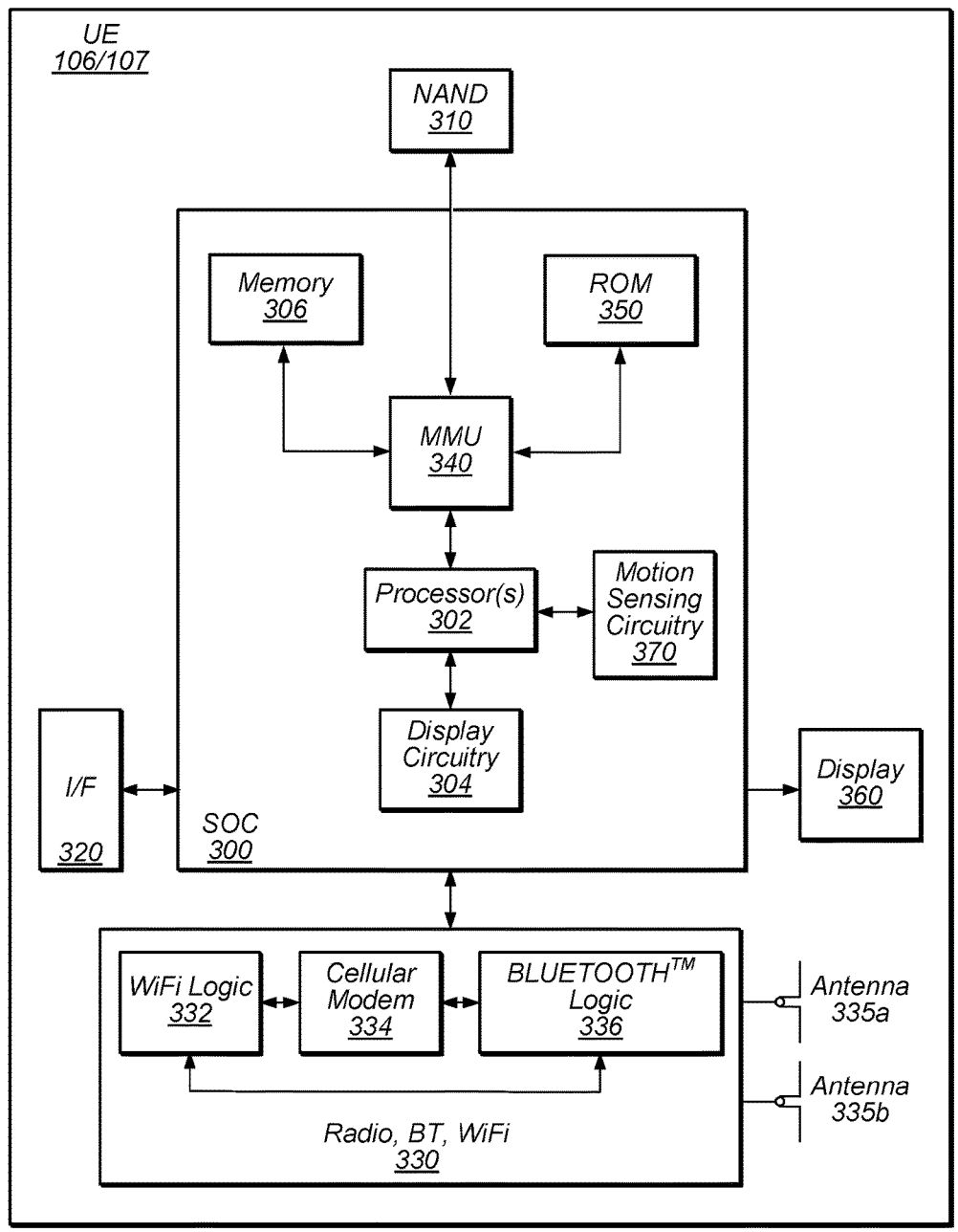
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
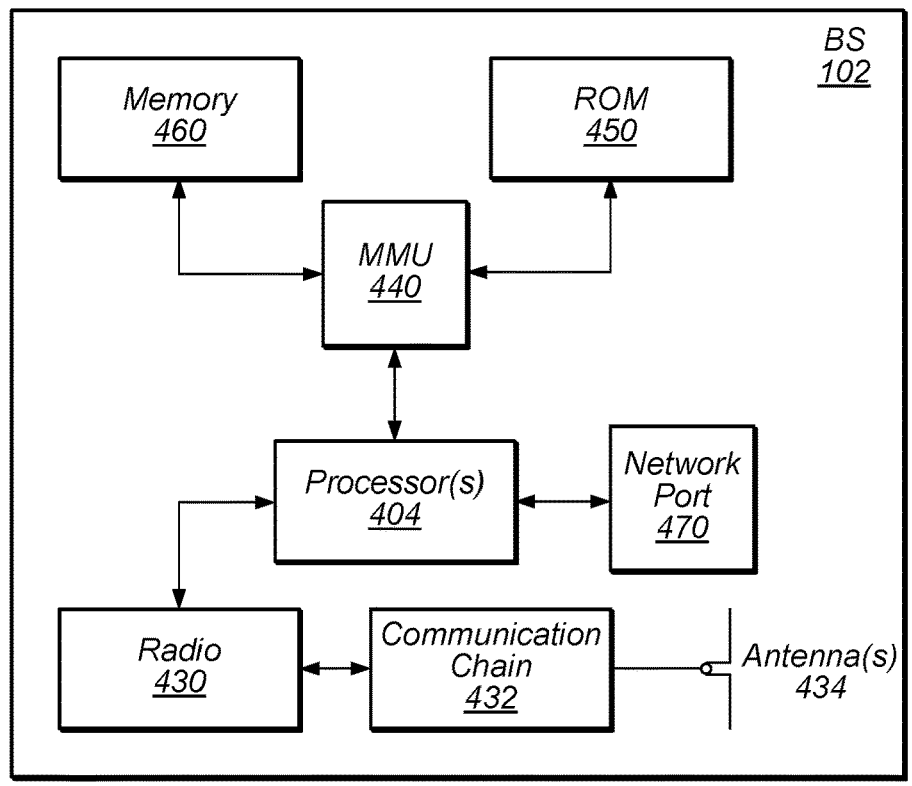
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

FIG. 5—Flowchart

Figure 5:
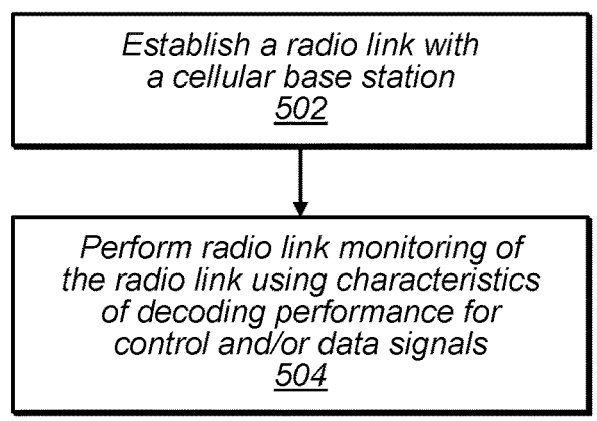
FIG. 5 is a flowchart diagram illustrating an exemplary method for performing radio link monitoring using downlink control and data decoding performance characteristics, according to some embodiments.

FIG. 5 is a flowchart diagram illustrating a method for a wireless device to perform radio link monitoring using downlink control and data decoding performance characteristics, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as a UE 106 or 107 illustrated in and described with respect to FIGS. 1-3, or more generally in conjunction with any of the computer systems or devices shown in the above Figures, among other devices, as desired. As shown, the method may operate as follows.

In 502, the wireless device may establish a radio link with a cellular base station. The radio link may operate according to a radio access technology, such as LTE, LTE-A, NR, WCDMA, etc. According to some embodiments, establishing the radio link may include any or all of acquiring system information for a cell deployed by a public land mobile network (PLMN), performing an attach procedure to attach to the PLMN by way of the cell (e.g., such that the cell acts as a serving cell for the wireless device), and establishing a radio resource control (RRC) connection with the serving cell. The serving cell may be provided by a cellular base station operated by the PLMN.

The wireless device and the cellular base station may perform control and data communication via the radio link. For example, in LTE, a base station may provide control signals via a physical downlink control channel (PDCCH) and may provide data signals via a physical downlink shared channel (PDSCH), according to some embodiments. In addition, the base station may provide reference signals (e.g., to assist with channel estimation, radio link monitoring, etc.), such as cell-specific reference signals (CRS), to the wireless device (and possibly to other wireless devices in communication with the base station).

In 504, the wireless device may perform radio link monitoring of the radio link using characteristics of decoding performance for control and/or data signals. The characteristics of decoding performance for control and/or data signals may be used to supplement the use of the reference signals provided by the base station to perform radio link monitoring, according to some embodiments.

For example, in some embodiments, performing radio link monitoring (RLM) may include determining one or more signal quality metric values (e.g., a signal to noise ratio (SNR)) of reference signals (e.g., CRS) provided by the base station via the radio link over the course of a radio link monitoring window, for each of multiple such radio link monitoring windows. The SNR (and/or other signal quality metric value) may be filtered (e.g., averaged over time) in any of various possible ways, if desired. For example, the SNR may be filtered over a RLM window (e.g., 200 ms for non-DRX while out-of-sync or 100 ms for non-DRX while in-sync, as one possibility) configured by the base station and/or determined from standard specification documents.

Once the SNR of the CRS is determined, it may be compared to one or more SNR threshold values, and/or possibly mapped to a block error rate (BLER) of decoding a hypothetical control signal from the base station and then compared to one or more BLER thresholds, to determine whether the wireless device is in-sync (e.g., if the SNR/hypothetical BLER is better than an in-sync threshold, which may also be referred to as "Qin" herein) or out-of-sync (e.g., if the SNR/hypothetical BLER is worse than an out-of-sync threshold, which may also be referred to as "Qout" herein). According to some embodiments, Qout may be represented by a filtered CRS SNR threshold that maps to achieving 10% hypothetical PDCCH BLER, while Qin may be represented by a filtered CRS SNR threshold that maps to achieving 2% hypothetical PDCCH BLER. Other Qout/Qin representations are also possible.

In-sync and out-of-sync counters may be maintained, and may be incremented if it is determined that the wireless device is in-sync or out-of-sync for a particular RLM window. According to some embodiments, if the out-of-sync counter reaches a certain threshold (e.g., if the wireless device has been out-of-sync a certain number of consecutive times), it may be determined that radio link failure has occurred. As another possibility, one or more timers (e.g., an out-of-sync timer) may also or alternatively be utilized as part of determining when radio link failure has occurred.

In some embodiments, using the characteristics of decoding performance for one or more of the control signals and the data signals as part of performing radio link monitoring may include determining a modification to each of one or more SNR and/or BLER threshold values (e.g., the in-sync threshold and/or the out-of-sync threshold) based on the decoding performance characteristics.

For example, in some instances the base station may power boost certain control channel (e.g., PDCCH, PHICH) and data channel (e.g., PDSCH) transmissions intended for coverage-constrained (e.g., link budget limited) wireless devices. However, in some instances, power boosting may not be applied to the resource elements carrying reference signals (e.g., CRS tones), e.g., to avoid causing potentially harmful interference to neighboring cells (or for any of a variety of other possible reasons).

In such a case, the SNR perceived on the CRS tones may not reflect the actual PDCCH/PDSCH decoding performance with PDCCH/PDSCH power boosting, so performing RLM without accounting for how such power boosting of the PDCCH/PDSCH may affect their decoding may not provide the most helpful indication of the state of the radio link. Accordingly, it may be beneficial to modify (e.g., bias) the SNR and/or BLER thresholds used with respect to the CRS SNR/hypothetical BLER to account for any control and/or data signal power boosting. For example, this may allow such network-assisted coverage-constrained UEs to benefit from power boosting in terms of extended coverage where an RLM algorithm that utilizes CRS SNR without taking into consideration network-assisted power boosting might deem the link unsustainable.

According to some embodiments, the base station may utilize a static power boosting factor to boost some or all control signals and data signals for the wireless device (e.g., indefinitely or for a specified period of time), such that the wireless device may be able to directly determine that power boosting is occurring for control and/or data signals intended for it. For example, the base station may signal an indication of the value of the power boosting factor (and possibly a length of time for which the power boosting will be active) to the wireless device using control signaling. As another possibility, the base station may be pre-configured to implicitly implement static power boosting of certain resource elements (e.g., those carrying PDCCH signaling intended for the wireless device, those carrying PDSCH signaling intended for the wireless device, etc.) under certain conditions and/or based on certain triggers, e.g., which may be pre-agreed between the wireless device maker/vendor and the operator/maker/vendor of the base station, such that the wireless device can determine that power boosting by a particular power boosting factor for certain control and/or data signals will occur for a particular period of time based on a triggering event or condition occurring. Other techniques for utilizing static power boosting (including techniques for a wireless device to directly determine when such static power boosting is occurring) are also possible.

Alternatively or in addition, according to some embodiments, the base station may not always be able to boost the control and data resource elements intended for the wireless device, and/or may not always be able to apply maximum power boosting to such resource elements, for example due to network loading and/or other considerations, and so may dynamically determine which resource elements to power boost and by how much, such that the wireless device is unable to directly determine how much power boosting is being applied by the base station at least some of the time.

In such instances, the wireless device may be able to infer the (e.g., average or approximate) power boosting factor used by the base station to boost transmit power of the control and/or data signals, e.g., based on measured characteristics of received control and/or data signals, and modify its RLM technique accordingly. For example, an amount of bias applied to the in-sync threshold and/or out-of-sync threshold for a RLM evaluation period may be determined based on measurement of the energy metric for successfully received control signals (e.g., PDCCH control channel elements (CCEs)), possibly in combination with one or more other metrics and/or configuration settings, during that RLM evaluation period. As one possibility, a pre-characterized or dynamic mapping of the energy metric to threshold modification factor(s) based on any or all of PDCCH aggregation level, PDCCH payload size, reference signal received power (RSRP)/path loss, power boosting level, and/or PDCCH CCE loading may be used.

In some embodiments, the actual received and successfully decoded control (e.g., PDCCH) subframes may be factored into the choice of in-sync threshold and/or out-of-sync threshold for an evaluation period. In other words, Qout/Qin may be adapted per evaluation period, based on actual received PDCCH subframes. Qout/Qin may also be adjusted (e.g., up/down, via positive/negative bias) based on lack of reception of PDCCH. Since channel estimation may also be dependent on CRS received power/SNR, and channel estimation affects both the detection/decoding of PDCCH and PDSCH subframes, adaptation of Qout/Qin may also take into consideration PDSCH (data channel) BLER, at least in some instances.

Note that while the wireless device may be able to directly determine when it is able to successfully decode control and data signals, it may not always be able to directly determine when it has missed control and data signals. However, at least in some instances, the wireless device may be able to infer some or all instances of missed control and/or data signals.

For example, the wireless device may be able to use symbol energy metrics and Tail Biting properties of the convolutional codes used on the PDCCH to detect a missed transmission, in some embodiments. Convolutional decoding via block trellis decoding may suffer unequal error protection. The end bits of a block decoder may suffer from lower reliability if no tail bits are present. Adding zero tail bits (ZTCC) and coding these bits decreases the code rate significantly for shorter transport block sizes. Tail biting convolution codes may thus help in increasing reliability while preserving the code rate. The encoder in TBCC starts and ends with first few information bits to indicate the end of a transmitted sequence. At the receiver, it may accordingly be possible to consider all the received sequences which start and end with the same state. Since LTE constraint length is 7 (at least according to some embodiments), it results in 6 additional bits and thus 64 possible states to consider. To reduce decoding complexity only a subset of these states may be considered. In order to realize the full gain of MLD in TB codes, a UE may be able to use techniques such as a modified Viterbi algorithm, repetitive decoding, typically used in decoding generalized tail-biting codes to realize full code rate gains. This could give the UE an additional gain of approximately 1 dB in blind decoding performance. Even if further decoding of PDCCH bits fails, the UE may be able to check the tail with the initial bits to make a determination on whether a PDCCH transmission is attempted.

As another example, in cases where semi-persistent-scheduling (SPS) grants are scheduled (e.g., such a grant may typically be scheduled periodically for a fixed duration), the wireless device may be able to determine if it has missed detection of PDSCH signals based on the periodicity of such a grant.

As a further possibility, when PDCCH boosting is enabled, based on the physical control format indicator channel (PCFICH) signaled by the network, the wireless device may be able to perform traffic to pilot ratio (TPR) estimation over the resource blocks in UE specific search space where PDCCH symbols are expected, e.g., to differentiate power boosting vs. non-boosting cases.

The wireless device may also be able to consider the redundancy version (RV) sequence over a period of time (e.g., 4 ms per 1 hybrid automatic repeat request (HARQ), as one possibility) typically used (and possibly fixed) by the network on the PDSCH and use this to count the number of PDCCH decode failures.

As a still further possibility, the wireless device may be able to infer that it has missed downlink control information based on downlink assignment index (DAI) information (e.g., when time division duplexing (TDD) LTE is used). The DAI may be signaled in downlink control information (DCI) in the PDCCH payload, and may be used to help the wireless device report accurate acknowledgement (e.g., ACK/NACK) information for received downlink grants to the base station. In a given subframe in which the wireless device has successfully decoded the PDCCH, the DAI field may reflect the number of downlink grants sent by the network since the last uplink bundled ACK/NACK subframe provided from the wireless device to the network. Thus, if this number is greater than the actual number of downlink grants received at the wireless device, the wireless device may be able to infer that it has missed PDCCH subframes in the period of time since the most recent uplink bundled ACK/NACK subframe, e.g., amounting to the difference between the network-signaled number of downlink grants and the number of downlink grants actually received by the wireless device.

Based on such techniques for determining when control and/or data signals intended for the wireless device were not detected, and based on determining how many control and/or data signals intended for the wireless device were successfully received and decoded, the wireless device may be able to estimate a decoding success rate for control signals and/or for data signals, e.g., over the RLM window.

Note that in addition to or as an alternative to biasing the in-sync and/or out-of sync threshold(s), the RLM procedure may be modified to manipulate the out-of-sync/in-sync count (e.g., N310/N311 values, according to LTE) and/or timers, e.g., to similarly increase the degree to which radio link monitoring is based on actual decoding of control and/or data signals during the monitoring interval. For example, as one possibility, if characteristics of actual decoding of control and/or data signals are indicative of a BLER better than that represented by the default Qout value, the out-of-sync count may be de-incremented, reset, or at least not incremented, even if the CRS SNR taken alone would result in an out-of-sync condition. Other such out-of-sync/in-sync count/timer modifications based on characteristics of control and/or data signal decoding are also possible.

Note that, at least according to some embodiments, the use of any or all of the characteristics of decoding performance for the control and/or data signals described herein when performing radio link monitoring may be applied selectively, if desired. For example, the wireless device may perform radio link monitoring based on the reference signals provided by the cellular base station without using the characteristics of decoding performance for the control and/or data signals at some times, and may perform radio link monitoring based on the reference signals provided by the cellular base station and also using the characteristics of decoding performance for the control and/or data signals at other times. The wireless device may determine whether to use the characteristics of decoding performance for the control and/or data signals in any of a variety of possible ways. As one possibility, the characteristics of decoding performance for the control and/or data signals may be used once a certain number of out-of-sync instances have occurred (e.g., once an out-of-sync counter reaches a threshold for implementing the use of characteristics of decoding performance for the control and/or data signals for radio link monitoring), and, once implemented, may cease being used once a certain number of in-sync instances have occurred (e.g., once an in-sync counter reaches a threshold for ceasing the use of characteristics of decoding performance for the control and/or data signals for radio link monitoring).

According to some embodiments, a modulation and coding scheme (MCS) used for transmission of data signals from the base station to the wireless device may be considered as part of the radio link monitoring algorithm and/or for determining when the radio link is and is not sustainable. For example, if the downlink performance metrics for control and data are poor (e.g., BLER is above a BLER threshold for RLF, such as 20% BLER), but the current MCS is not the lowest possible (e.g., most robust) MCS, it may be possible that a reduction in MCS may improve the BLER and the radio link may be sustainable without triggering RLF. In such a case, the wireless device might enable a timer (e.g., a hysteresis timer) to provide the network with time to converge on the outer loop and schedule a lower MCS. Such a reduction in MCS, if it occurs, may trigger re-evaluation of the radio link, according to some embodiments, as BLER experienced on the radio link may decrease with the lower MCS; however, if the timer expires without a change of MCS, the wireless device may trigger RLF, e.g., rather than continuing to wait indefinitely for an MCS reduction that may not be forthcoming. The timer length may be determined in any of various possible manners, as desired, such as using laboratory measurements to optimize the timer length for a desired outcome according to one or more metrics, possibly depending on which network the wireless device is attached to.

According to some embodiments, if the scheduled MCS is greater than or equal to the lowest possible MCS and the downlink performance metrics for control and data are acceptable (e.g., BLER is below a BLER threshold for RLF), it may be determined that the wireless device can sustain the radio link without triggering RLF. If, on the other hand, the scheduled MCS is already at the lowest possible MCS and the downlink performance metrics for control and data are poor (e.g., BLER is above a BLER threshold for RLF), it may be determined that network power boosting (if any) provided by the base station is not helping sufficiently and the wireless device may trigger RLF.

Note that any or all of the techniques for performing radio link monitoring using characteristics of decoding performance for control signals and/or data signals may be used in combination, if desired. For example, according to some embodiments, some or all aspects of the techniques described herein may be used as part of an outer loop type algorithm at the wireless device for utilizing decoding performance characteristics of control and data signals in combination with reference signals provided by the base station to provide a more holistic view of the status of the radio link than by simply relying on the reference signals alone.

Note further that while certain of the techniques described herein may be useful primarily for coverage-constrained/link-budget-limited devices that receive network assistance in the form of control and/or data signal power boosting, at least some of the techniques described herein may be useful more broadly for non link budget limited devices as well. For example, estimating a success rate of control and/or data signal reception and decoding and applying such an indication of actual decoding performance as a supplement or alternative to reference signal based hypothetical decoding performance, and considering a modulation and coding scheme for data signals when determining whether to trigger RLF, among other possible techniques, may improve radio link monitoring for both link budget limited and non link budget limited wireless devices, according to some embodiments.

Figure 6:
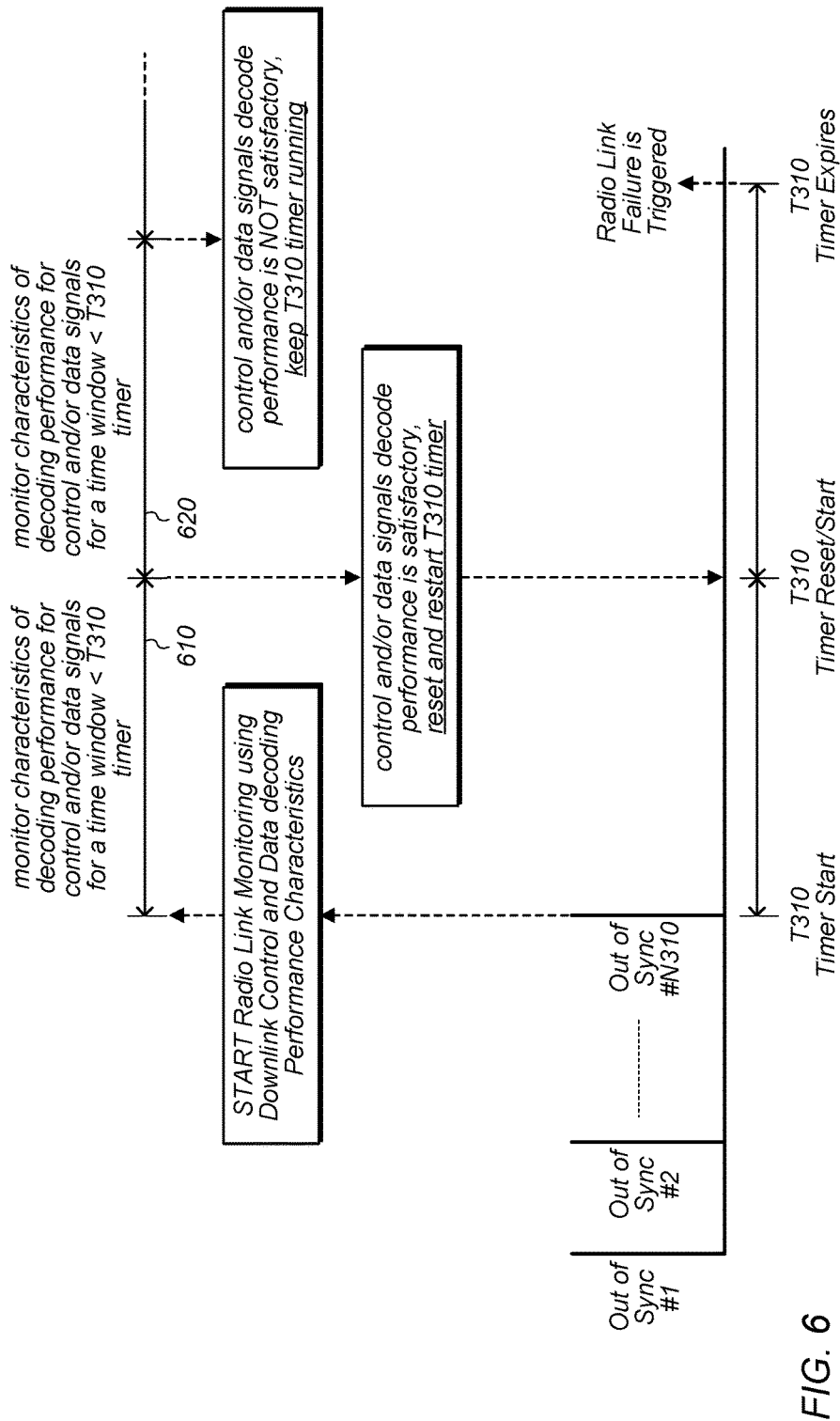
FIGS. 6-8 are timing diagrams illustrating exemplary possible radio link monitoring scenarios for a wireless device capable of performing radio link monitoring based at least in part on characteristics of decoding performance for control and/or data signals, according to some embodiments.
Figure 7:
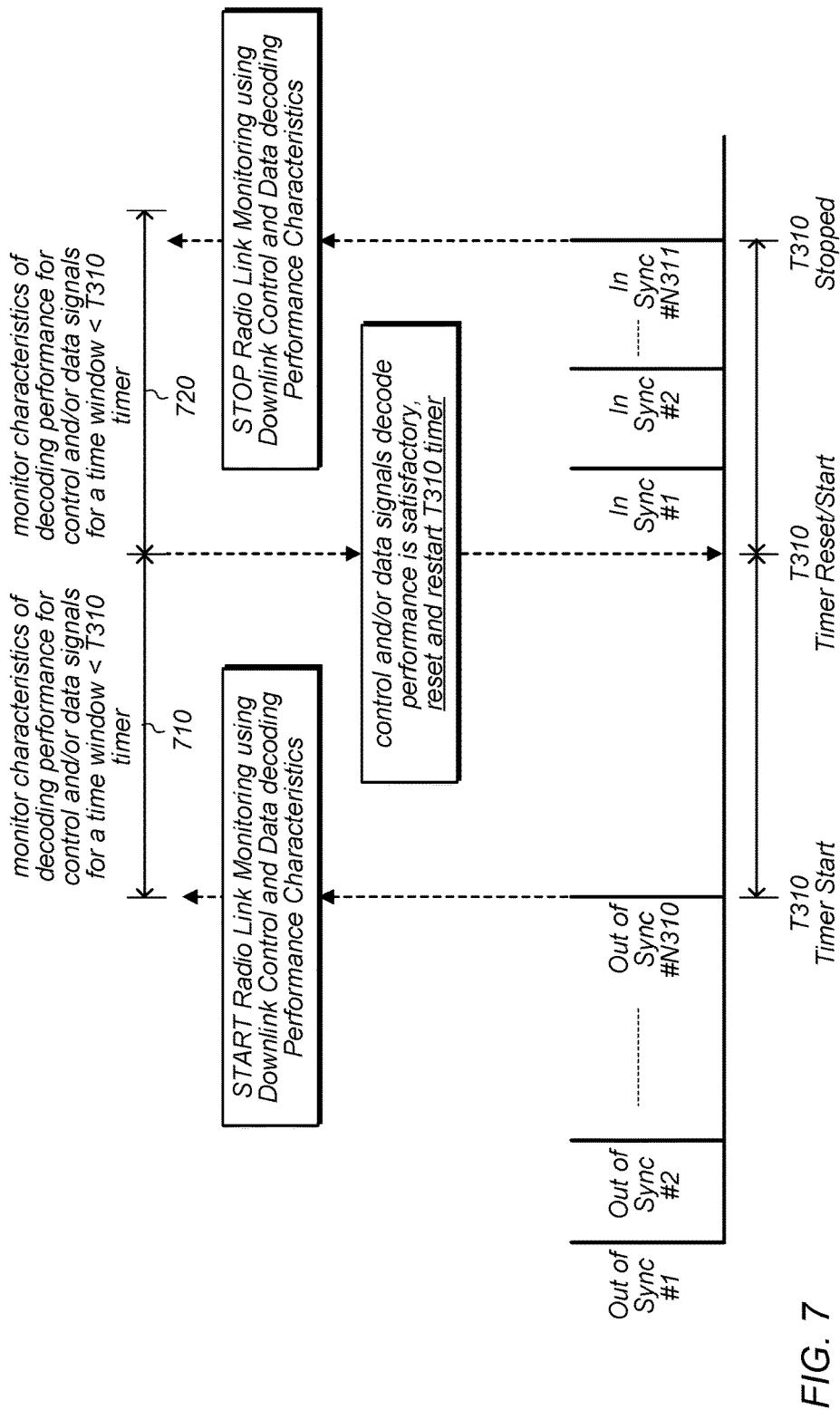
Figure 8:
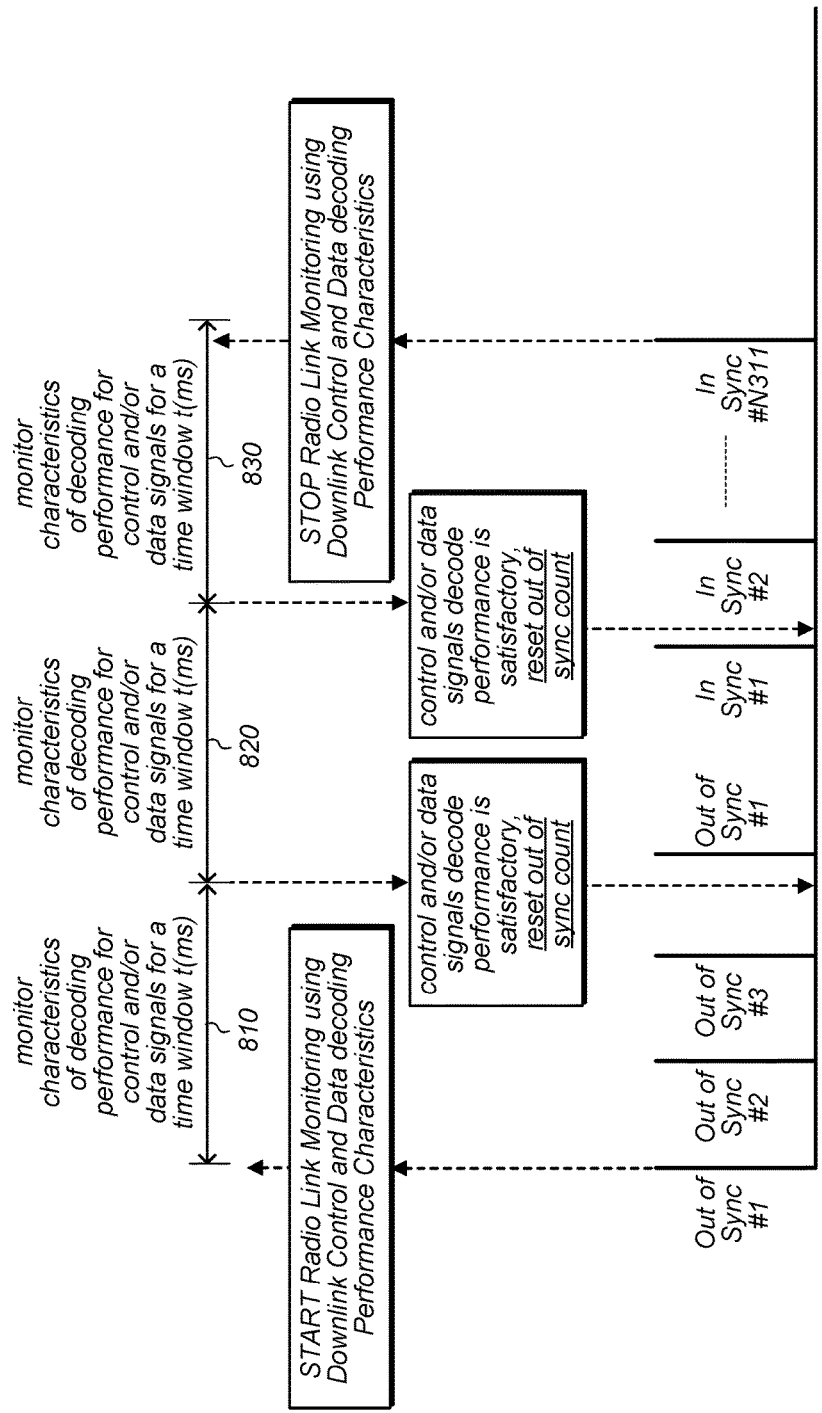

FIGS. 6-8—Example Timing Diagrams

FIGS. 6-8 are timing diagrams illustrating a number of possible radio link monitoring scenarios that may occur for a wireless device capable of performing radio link monitoring based at least in part on characteristics of decoding performance for control and/or data signals, such as a wireless device configured to implement a method according to FIG. 5, according to some embodiments. Note that FIGS. 6-8 and the description thereof are provided by way of example, and are not intended to be limiting to the disclosure as a whole. Numerous alternatives to and variations of the details provided herein below are possible and should be considered within the scope of the present disclosure.

In the scenario of FIG. 6, a wireless device may initially perform radio link monitoring based on reference signals provided by its serving base station without utilizing downlink control and/or data decoding performance characteristics. Using this radio link monitoring technique, the wireless device may determine that it is out-of-sync during a threshold number of out-of-sync instances (e.g., "N310", which may be specified by standard specification documents, selected by a network infrastructure maker/vendor/operator, and/or otherwise determined) configured to trigger initiation of an out-of-sync or radio link failure timer (e.g., having a length "T310", which may be specified by standard specification documents, selected by a network infrastructure maker/vendor/operator, and/or otherwise determined). The threshold number of out-of-sync instances occurring may also trigger the wireless device to begin utilizing downlink control and/or data decoding performance characteristics when performing radio link monitoring for a subsequent evaluation window (which may be shorter than the length of the out-of-sync/radio link failure timer).

In this scenario, if the control and/or data decoding performance is satisfactory (e.g., meets one or more specified conditions) over an evaluation window, the out-of-sync/radio link failure timer may be reset and restarted, such as illustrated in the evaluation window 610. If, however, the control and/or data decoding performance is not satisfactory (e.g., does not meet the one or more specified conditions) over an evaluation window, the out-of-sync/radio link failure timer may not be modified (e.g., may keep running), such as illustrated in the evaluation window 620. This may eventually result in radio link failure occurring if the out-of-sync/radio link failure timer expires, as shown in FIG. 6.

In the scenario of FIG. 7, the wireless device may similarly initially perform radio link monitoring based on reference signals provided by its serving base station without utilizing downlink control and/or data decoding performance characteristics. Using this radio link monitoring technique, the wireless device may also determine that it is out-of-sync during N310 out-of-sync instances, triggering initiation of the T310 timer. As in FIG. 6, the threshold number of out-of-sync instances occurring may also trigger the wireless device to begin utilizing downlink control and/or data decoding performance characteristics when performing radio link monitoring for a subsequent evaluation window.

In this scenario, if the control and/or data decoding performance is satisfactory (e.g., meets one or more specified conditions) over an evaluation window, the out-of-sync/radio link failure timer may be reset and restarted, such as illustrated in the evaluation window 710. If the radio link monitoring subsequently determines that the radio link is in-sync during a threshold number of in-sync instances (e.g., "N311", which may be specified by standard specification documents, selected by a network infrastructure maker/vendor/operator, and/or otherwise determined), the T310 timer may be stopped, and the wireless device may cease utilizing downlink control and/or data decoding performance characteristics for radio link monitoring (e.g., until the next time the number of out-of-sync instances reaches N310 and T310 starts again). Note that this may occur in the middle of an evaluation window, such as in the illustrated evaluation window 720.

In the scenario of FIG. 8, an alternate (or additional) approach may be taken to determining when to trigger use of downlink control and/or data decoding performance characteristics for radio link monitoring. In this case, the downlink control and/or data decoding performance characteristics may be used for radio link monitoring once the first out-of-sync instance occurs (or more generally upon the nth out-of-sync instance, where n<N310; n=1 in the scenario of FIG. 8).

An evaluation window for using the downlink control and/or data decoding performance characteristics for radio link monitoring may be denoted as t (e.g., in milliseconds). The evaluation window length t may vary in different circumstances, e.g., depending on whether the wireless device is currently in connected discontinuous reception (CDRX) or non-CDRX mode. At least according to some embodiments, the evaluation window length t may be selected such that it ends before the N310 count of out-of-sync instances can be reached.

According to the scenario of FIG. 8, if the control and/or data decoding performance is satisfactory over the evaluation window, the out-of-sync count may be reset (e.g., to 0) or reduced, such as illustrated in the evaluation windows 810, 820. If the control and/or data decoding performance is not satisfactory over the evaluation window, the out-of-sync count may not be reset, and if it reaches the N310 value, the timer T310 may be started. If desired, the techniques described with respect to FIGS. 6-7 may additionally be used to potentially reset the T310 timer once it has begun in this scenario.

Note that in the scenario of FIG. 8, it is also possible that the T310 timer may not be started, e.g., due to the out-of-sync count not reaching N310, and due to radio conditions improving such that N311 consecutive in-sync instances occur. In this case, the wireless device may cease utilizing downlink control and/or data decoding performance characteristics for radio link monitoring (e.g., until the next time the number of out-of-sync instances reaches n), possibly even if this occurs in the middle of an evaluation window, such as in the illustrated evaluation window 830.

In the following further exemplary embodiments are provided.

One set of embodiments may include an apparatus, comprising: a processing element configured to cause a wireless device to: establish a radio link with a cellular base station according to a radio access technology, wherein the base station provides reference signals, control signals, and data signals to the wireless device via the radio link; perform radio link monitoring of the radio link based at least in part on the reference signals; and determine whether to perform radio link monitoring of the radio link further based at least in part on characteristics of decoding performance for one or more of the control signals and the data signals, wherein performing radio link monitoring of the radio link is further based at least in part on the characteristics of decoding performance for one or more of the control signals and the data signals when it is determined to perform radio link monitoring of the radio link further based at least in part on characteristics of decoding performance for one or more of the control signals and the data signals.

According to some embodiments, performing radio link monitoring of the radio link comprises determining whether the radio link is in-sync or out-of-sync and determining whether radio link failure has occurred.

According to some embodiments, determining whether to perform radio link monitoring of the radio link further based at least in part on characteristics of decoding performance for one or more of the control signals and the data signals is based at least in part on whether a number of out-of-sync instances reaches an out-of-sync threshold.

According to some embodiments, performing radio link monitoring of the radio link comprises, when it is determined not to perform radio link monitoring of the radio link further based at least in part on characteristics of decoding performance for one or more of the control signals and the data signals: determining a signal to noise ratio (SNR) of the reference signals during a monitoring window; comparing the SNR of the reference signals during the monitoring window to one or more SNR threshold values to determine whether the radio link is in-sync or out-of-sync during the monitoring window; and determining whether radio link failure has occurred based at least in part on whether the radio link is in-sync or out-of-sync during the monitoring window, wherein performing radio link monitoring of the radio link comprises, when it is determined to perform radio link monitoring of the radio link further based at least in part on characteristics of decoding performance for one or more of the control signals and the data signals: determining a signal to noise ratio (SNR) of the reference signals during a monitoring window; determining a modification to one or more SNR threshold values based on the characteristics of decoding performance for one or more of the control signals and the data signals during the monitoring window; comparing the SNR of the reference signals during the monitoring window to the one or more modified SNR threshold values to determine whether the radio link is in-sync or out-of-sync during the monitoring window; and determining whether radio link failure has occurred based at least in part on whether the radio link is in-sync or out-of-sync during the monitoring window.

According to some embodiments, wherein the characteristics of decoding performance for one or more of the control signals and the data signals comprise at least a power boosting factor used by the base station to boost transmit power of one or more of the control signals or the data signals relative to the reference signals.

According to some embodiments, the processing element is further configured to cause the wireless device to, when performing radio link monitoring of the radio link based at least in part on the reference signals and further based at least in part on characteristics of decoding performance for one or more of the control signals and the data signals: reset one or more of an out-of-sync counter or an out-of-sync timer when decoding performance for one or more of the control signals and the data signals during a monitoring window meets one or more resetting criteria.

Another set of embodiments may include a method for a wireless device, comprising: establishing a radio link with a cellular base station according to a radio access technology, wherein the base station provides reference signals, control signals, and data signals to the wireless device via the radio link; and performing radio link monitoring of the radio link using characteristics of decoding performance for one or more of the control signals and the data signals, wherein performing radio link monitoring of the radio link comprises determining whether the radio link is in-sync or out-of-sync and determining whether radio link failure has occurred.

According to some embodiments, radio link monitoring of the radio link is further based at least in part on the reference signals.

According to some embodiments, performing radio link monitoring of the radio link comprises: determining a signal to noise ratio (SNR) of cell-specific reference signals (CRS) provided by the base station via the radio link; determining a modification to each of one or more SNR threshold values based on the characteristics of decoding performance for one or more of the control signals and the data signals; comparing the determined SNR to the modified one or more SNR threshold values to determine whether the radio link is in-sync or out-of-sync and whether radio link failure has occurred.

According to some embodiments, the characteristics of decoding performance for one or more of the control signals and the data signals comprise at least a power boosting factor used by the base station to boost transmit power of one or more of the control signals or the data signals relative to the reference signals.

According to some embodiments, an indication of a value of the power boosting factor is received from the base station by the wireless device.

According to some embodiments, a value of the power boosting factor is inferred by the wireless device based on measured characteristics of received control and/or data signals or is a predetermined value known by the wireless device a priori.

According to some embodiments, performing radio link monitoring of the radio link comprises: adjusting one or more out-of-sync or in-sync counters and/or timers based at least in part on the characteristics of decoding performance for one or more of the control signals and the data signals.

According to some embodiments, the method further comprises: estimating a decoding success rate for the control signals over a radio link monitoring window; and determining a modulation and coding scheme (MCS) for the data signals; wherein performing radio link monitoring of the radio link is further based at least in part on the estimated decoding success rate and the determined MCS.

According to some embodiments, estimating a decoding success rate for the control signals over a radio link monitoring window comprises determining that one or more control signals intended for the wireless device were not detected based on one or more of: symbol energy metrics and tail biting properties of convolutional codes of the control signals; a semi-persistent-scheduling grant; traffic to pilot ratio (TPR) estimation; a redundancy version (RV) sequence pattern used in conjunction with data signals transmitted by the base station using a hybrid automatic repeat request (HARQ) retransmission technique; or downlink assignment index (DAI) information.

Yet another set of embodiments may include a wireless device, comprising: an antenna; a radio coupled to the antenna; and a processing element coupled to the radio; wherein the wireless device is configured to establish a radio link with a cellular base station according to a radio access technology, wherein the base station provides reference signals, control signals, and data signals to the wireless device via the radio link; and perform radio link monitoring of the radio link based at least in part on the reference signals and further based at least in part on characteristics of decoding performance for one or more of the control signals and the data signals.

According to some embodiments, the radio link monitoring comprises determining whether the radio link is in-sync or out-of-sync for each of a plurality of monitoring windows, wherein the characteristics of decoding performance for one or more of the control signals and the data signals are used to perform radio link monitoring based at least in part on determining that the radio link has been out-of-sync for at least an out-of-sync threshold number of monitoring windows.

According to some embodiments, at a later time, the wireless device is configured to: determine that the radio link has been in-sync for at least an in-sync threshold number of monitoring windows; wherein the characteristics of decoding performance for one or more of the control signals and the data signals are not used to perform radio link monitoring at the later time based at least in part on determining that the radio link has been in-sync for at least the in-sync threshold number of monitoring windows.

According to some embodiments, to perform radio link monitoring of the radio link based at least in part on the reference signals and further based at least in part on characteristics of decoding performance for one or more of the control signals and the data signals, the wireless device is further configured to: determine a signal quality metric value for the reference signals provided by the base station via the radio link during a monitoring window; determine a modification to at least one signal quality metric threshold value based on the characteristics of decoding performance for one or more of the control signals and the data signals received during the monitoring window to produce at least one modified signal quality metric threshold value for the monitoring window; and compare the signal quality metric value to the at least one modified signal quality metric threshold value to determine whether the radio link is in-sync or out-of-sync during the monitoring window.

According to some embodiments, to perform radio link monitoring of the radio link, the wireless device is further configured to: adjust one or more of the following based at least in part on the characteristics of decoding performance for one or more of the control signals and the data signals: an out-of-sync counter; an in-sync counter; or an out-of-sync timer.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processing element configured to cause a wireless device to:
establish a radio link with a cellular base station according to a radio access technology, wherein the base station provides reference signals, control signals, and data signals to the wireless device via the radio link;
perform radio link monitoring of the radio link based at least in part on the reference signals; and
determine whether to perform radio link monitoring of the radio link further based at least in part on characteristics of decoding performance for one or more of the control signals and the data signals, wherein performing radio link monitoring of the radio link is further based at least in part on the characteristics of decoding performance for one or more of the control signals and the data signals when it is determined to perform radio link monitoring of the radio link further based at least in part on characteristics of decoding performance for one or more of the control signals and the data signals, and wherein the characteristics of decoding performance for one or more of the control signals and the data signals comprise at least a power boosting factor used by the base station to boost transmit power of one or more of the control signals or the data signals relative to the reference signals.

2. The apparatus of claim 1,
wherein performing radio link monitoring of the radio link comprises determining whether the radio link is in-sync or out-of-sync and determining whether radio link failure has occurred.

3. The apparatus of claim 1,
wherein determining whether to perform radio link monitoring of the radio link further based at least in part on characteristics of decoding performance for one or more of the control signals and the data signals is based at least in part on whether a number of out-of-sync instances reaches an out-of-sync threshold.

4. The apparatus of claim 1,
wherein performing radio link monitoring of the radio link comprises, when it is determined not to perform radio link monitoring of the radio link further based at least in part on characteristics of decoding performance for one or more of the control signals and the data signals:
determining a signal to noise ratio (SNR) of the reference signals during a monitoring window;
comparing the SNR of the reference signals during the monitoring window to one or more SNR threshold values to determine whether the radio link is in-sync or out-of-sync during the monitoring window; and
determining whether radio link failure has occurred based at least in part on whether the radio link is in-sync or out-of-sync during the monitoring window,
wherein performing radio link monitoring of the radio link comprises, when it is determined to perform radio link monitoring of the radio link further based at least in part on characteristics of decoding performance for one or more of the control signals and the data signals:
determining a signal to noise ratio (SNR) of the reference signals during a monitoring window;
determining a modification to one or more SNR threshold values based on the characteristics of decoding performance for one or more of the control signals and the data signals during the monitoring window;
comparing the SNR of the reference signals during the monitoring window to the one or more modified SNR threshold values to determine whether the radio link is in-sync or out-of-sync during the monitoring window; and
determining whether radio link failure has occurred based at least in part on whether the radio link is in-sync or out-of-sync during the monitoring window.

5. The apparatus of claim 1,
wherein an indication of a value of the power boosting factor is received from the base station by the wireless device.

6. The apparatus of claim 1, wherein the processing element is further configured to cause the wireless device to, when performing radio link monitoring of the radio link based at least in part on the reference signals and further based at least in part on characteristics of decoding performance for one or more of the control signals and the data signals:
reset one or more of an out-of-sync counter or an out-of-sync timer when decoding performance for one or more of the control signals and the data signals during a monitoring window meets one or more resetting criteria.

7. The apparatus of claim 1,
wherein a value of the power boosting factor is inferred by the wireless device based on measured characteristics of received control and/or data signals or is a predetermined value known by the wireless device a priori.

8. A method for a wireless device, comprising:
establishing a radio link with a cellular base station according to a radio access technology, wherein the base station provides reference signals, control signals, and data signals to the wireless device via the radio link;
estimating a decoding success rate for the control signals over a radio link monitoring window; and
determining a modulation and coding scheme (MCS) for the data signals; and
performing radio link monitoring of the radio link using characteristics of decoding performance for one or more of the control signals and the data signals, wherein performing radio link monitoring of the radio link comprises determining whether the radio link is in-sync or out-of-sync and determining whether radio link failure has occurred, and wherein performing radio link monitoring of the radio link is further based at least in part on the estimated decoding success rate and the determined MCS.

9. The method of claim 8, wherein performing radio link monitoring of the radio link comprises:
determining a signal to noise ratio (SNR) of cell-specific reference signals (CRS) provided by the base station via the radio link;
determining a modification to each of one or more SNR threshold values based on the characteristics of decoding performance for one or more of the control signals and the data signals;
comparing the determined SNR to the modified one or more SNR threshold values to determine whether the radio link is in-sync or out-of-sync and whether radio link failure has occurred.

10. The method of claim 8,
wherein the characteristics of decoding performance for one or more of the control signals and the data signals comprise at least a power boosting factor used by the base station to boost transmit power of one or more of the control signals or the data signals relative to the reference signals.

11. The method of claim 10, wherein an indication of a value of the power boosting factor is received from the base station by the wireless device.

12. The method of claim 10, wherein a value of the power boosting factor is inferred by the wireless device based on measured characteristics of received control and/or data signals or is a predetermined value known by the wireless device a priori.

13. The method of claim 8, wherein performing radio link monitoring of the radio link comprises:
adjusting one or more out-of-sync or in-sync counters and/or timers based at least in part on the characteristics of decoding performance for one or more of the control signals and the data signals.

14. The method of claim 8, wherein radio link monitoring of the radio link is further based at least in part on the reference signals.

15. The method of claim 8, wherein estimating a decoding success rate for the control signals over a radio link monitoring window comprises determining that one or more control signals intended for the wireless device were not detected based on one or more of:
symbol energy metrics and tail biting properties of convolutional codes of the control signals;
a semi-persistent-scheduling grant;
traffic to pilot ratio (TPR) estimation;
a redundancy version (RV) sequence pattern used in conjunction with data signals transmitted by the base station using a hybrid automatic repeat request (HARQ) retransmission technique; or
downlink assignment index (DAI) information.

16. A wireless device, comprising:
an antenna;
a radio coupled to the antenna; and
a processing element coupled to the radio;
wherein the wireless device is configured to:
establish a radio link with a cellular base station according to a radio access technology, wherein the base station provides reference signals, control signals, and data signals to the wireless device via the radio link; and
perform radio link monitoring of the radio link based at least in part on the reference signals and further based at least in part on characteristics of decoding performance for one or more of the control signals and the data signals, wherein the radio link monitoring comprises determining whether the radio link is in-sync or out-of-sync for each of a plurality of monitoring windows, and wherein the characteristics of decoding performance for one or more of the control signals and the data signals are used to perform radio link monitoring based at least in part on determining that the radio link has been out-of-sync for at least an out-of-sync threshold number of monitoring windows.

17. The wireless device of claim 16, wherein the characteristics of decoding performance for one or more of the control signals and the data signals comprise at least a power boosting factor used by the base station to boost transmit power of one or more of the control signals or the data signals relative to the reference signals.

18. The wireless device of claim 16, wherein, at a later time, the wireless device is configured to:
determine that the radio link has been in-sync for at least an in-sync threshold number of monitoring windows; and
wherein the characteristics of decoding performance for one or more of the control signals and the data signals are not used to perform radio link monitoring at the later time based at least in part on determining that the radio link has been in-sync for at least the in-sync threshold number of monitoring windows.

19. The wireless device of claim 16, wherein to perform radio link monitoring of the radio link based at least in part on the reference signals and further based at least in part on characteristics of decoding performance for one or more of the control signals and the data signals, the wireless device is further configured to:
determine a signal quality metric value for the reference signals provided by the base station via the radio link during a monitoring window;
determine a modification to at least one signal quality metric threshold value based on the characteristics of decoding performance for one or more of the control signals and the data signals received during the monitoring window to produce at least one modified signal quality metric threshold value for the monitoring window; and
compare the signal quality metric value to the at least one modified signal quality metric threshold value to determine whether the radio link is in-sync or out-of-sync during the monitoring window.

20. The wireless device of claim 16, wherein to perform radio link monitoring of the radio link, the wireless device is further configured to:
adjust one or more of the following based at least in part on the characteristics of decoding performance for one or more of the control signals and the data signals:
an out-of-sync counter;
an in-sync counter; or
an out-of-sync timer.

* * * * *